United States Patent [19]

Piper et al.

[11] Patent Number: 4,999,908

[45] Date of Patent: Mar. 19, 1991

[54] BATTERY HEAT SEALING MACHINE AND METHOD

[75] Inventors: Alan L. Piper, Baton Rouge; Dennis E. Magee, Walker; Thomas E. Ferris, Baton Rouge, all of La.

[73] Assignee: Daniell Battery Mfg. Co., Inc., Baton Rouge, La.

[21] Appl. No.: 435,594

[22] Filed: Nov. 13, 1989

[51] Int. Cl.$^5$ .................... B23P 19/00; H01M 6/00
[52] U.S. Cl. ........................... 29/730; 29/623.2; 429/185; 156/499
[58] Field of Search ............ 29/623.2, 730, 731, 29/623.1; 429/185, 171, 174; 156/272.2, 499, 566, 583.1

[56] References Cited

U.S. PATENT DOCUMENTS

| | | | |
|---|---|---|---|
| 1,932,136 | 10/1933 | Hole | 113/59 |
| 2,324,523 | 7/1943 | Lund | 29/84 |
| 3,427,205 | 4/1969 | Plitt et al. | 136/133 |
| 3,441,448 | 8/1969 | Hayward et al. | 136/176 |
| 3,544,383 | 8/1970 | Oltman | 136/133 |
| 3,627,617 | 6/1971 | Schaumburg | 156/566 |
| 3,629,010 | 12/1971 | Hahn | 136/176 |
| 3,686,056 | 2/1972 | Fiandt | 156/499 |
| 3,778,314 | 3/1973 | Kano et al. | 136/176 |
| 3,873,400 | 3/1975 | Tsuchida et al. | 156/499 |
| 3,883,369 | 12/1975 | Badger et al. | 136/176 |
| 3,908,738 | 9/1975 | Bruzas et al. | 164/80 |
| 3,908,743 | 11/1975 | Schenk, Jr. et al. | 164/80 |
| 3,909,300 | 6/1975 | Schenk, Jr. et al. | 136/134 R |
| 3,909,301 | 7/1975 | Schenk, Jr. | 136/134 R |
| 4,091,189 | 5/1978 | Farwer et al. | 429/181 |
| 4,186,246 | 1/1980 | Sugalski | 429/60 |
| 4,221,626 | 9/1980 | Clay | 156/366 |
| 4,252,873 | 12/1981 | Epstein et al. | 429/181 |
| 4,306,355 | 12/1981 | Hawrylo et al. | 29/623.2 |
| 4,308,323 | 2/1981 | Bowsky | 429/181 |
| 4,310,376 | 1/1982 | Ebina et al. | 156/499 |
| 4,502,213 | 5/1985 | Madden et al. | 29/730 |
| 4,507,856 | 4/1985 | Pearson | 29/623.1 |
| 4,509,252 | 4/1985 | Sabatino et al. | 29/623.1 |
| 4,525,923 | 6/1985 | Alvarez | 29/730 |
| 4,567,121 | 1/1986 | Gilmour | 429/181 |
| 4,596,625 | 5/1986 | Alvarez | 156/499 |
| 4,603,095 | 7/1986 | Bowsky | 429/181 |
| 4,656,736 | 4/1987 | Volkhin | 29/730 |

Primary Examiner—Anthony Skapars
Attorney, Agent, or Firm—Norvell E. Von Behren

[57] ABSTRACT

A battery heat seal machine and method for sealing a top cover to a battery container. The machine has a one-piece heating platen with thermal expansion features which eliminate stress on the platen bearings that support the platen. A new type of top cover holder and pickup device is also employed in the machine to positively grasp the top cover around the center line of the cover and to lift it up and return it as desired. The pickup device design may be used with small automotive batteries and with large commercial batteries. A mobile platen transfer device is used with the machine to quickly and safely remove an outgoing platen and replace it with an incoming platen when changing battery sizes and types on the battery assembly line.

13 Claims, 8 Drawing Sheets

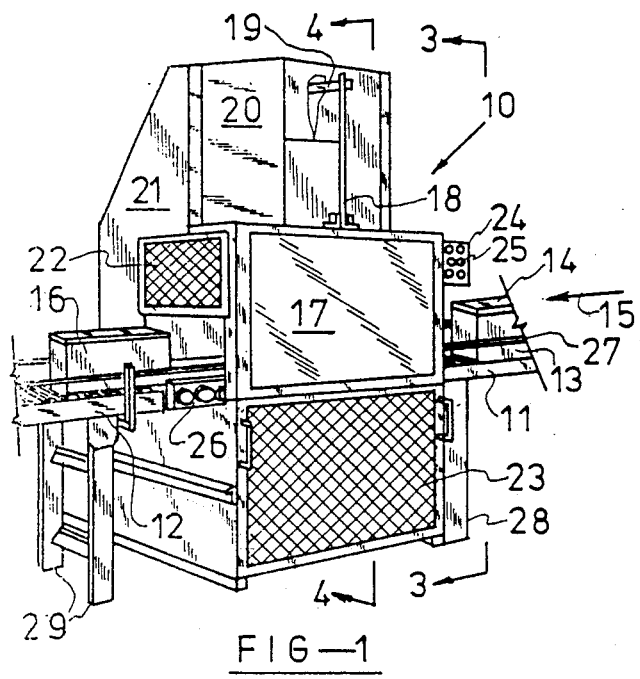
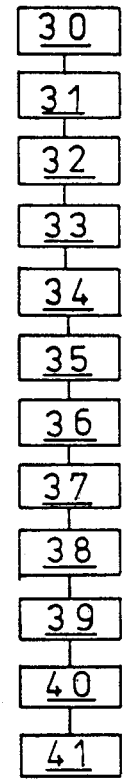
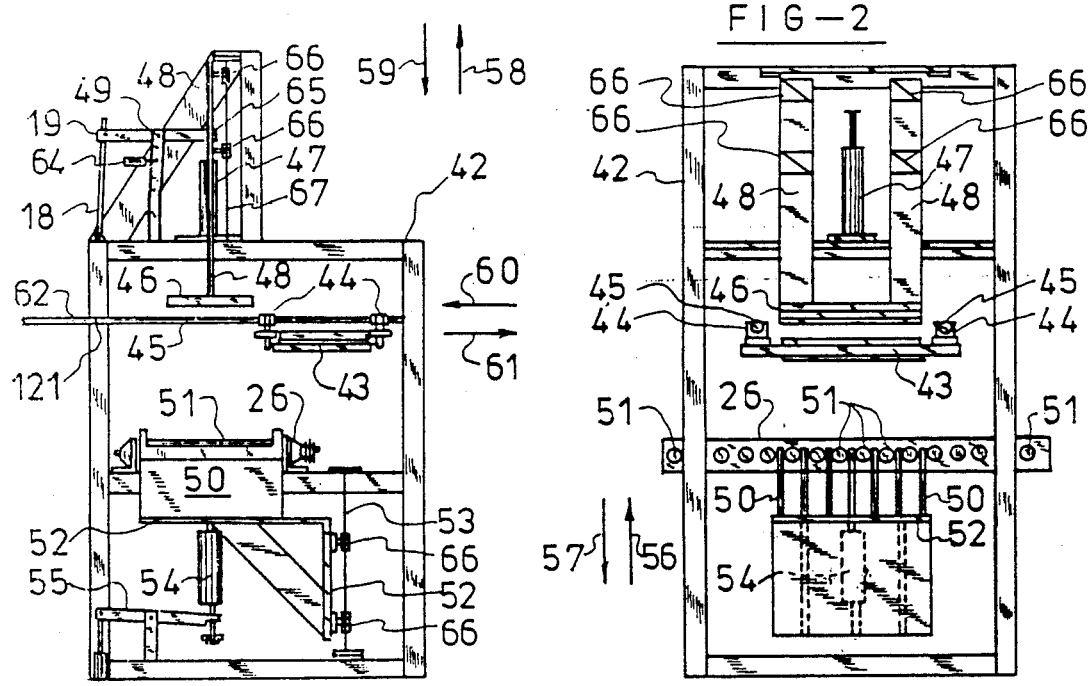
FIG-1
FIG-2
FIG-3
FIG-4

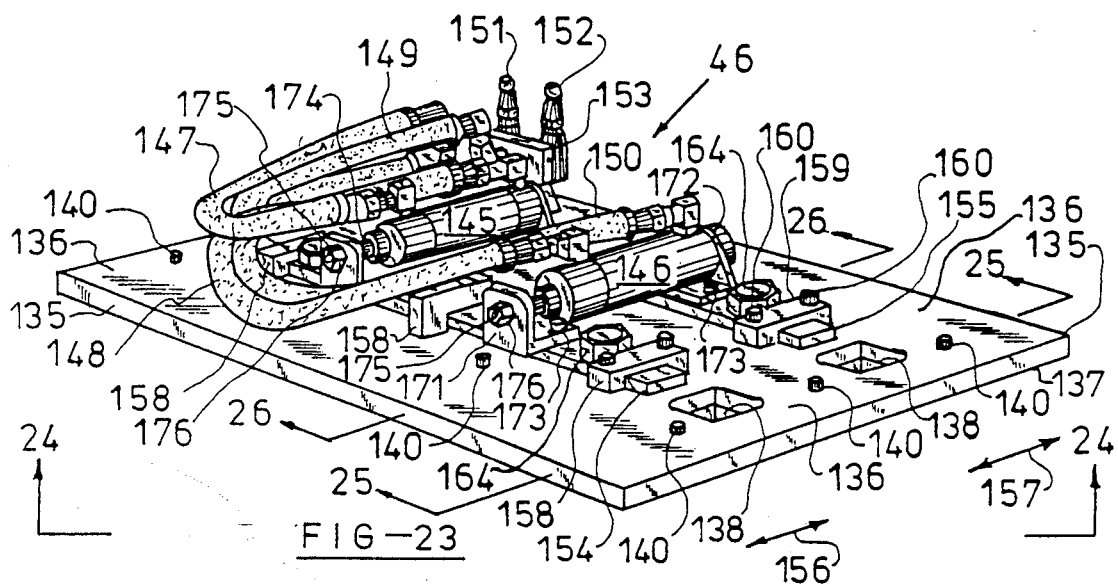
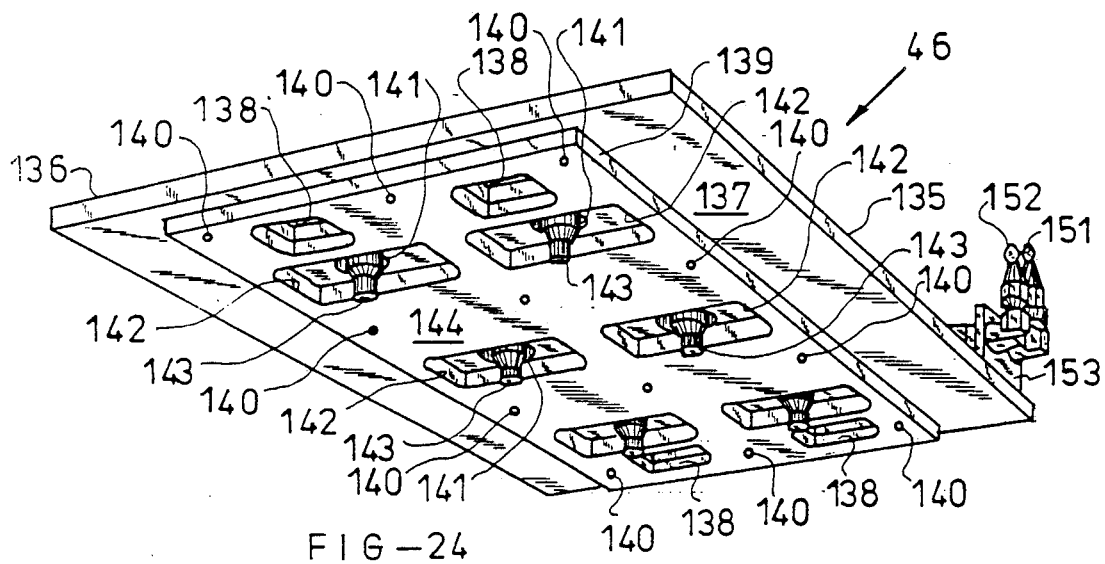
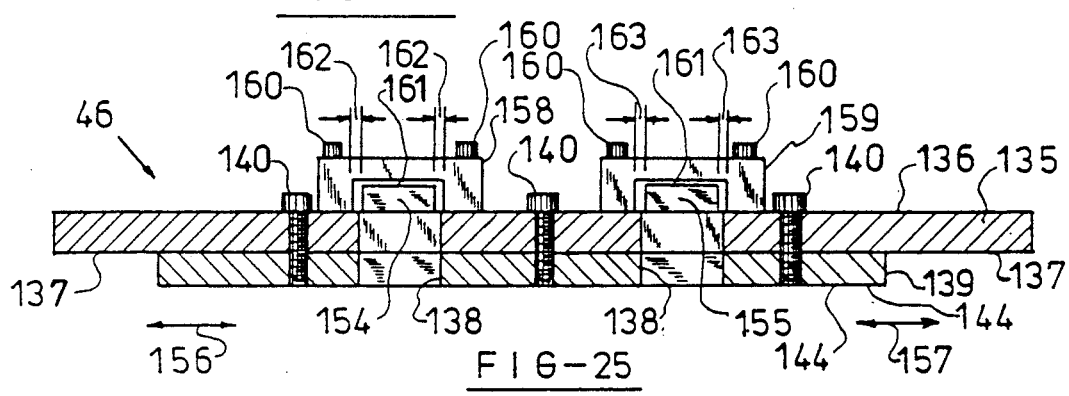

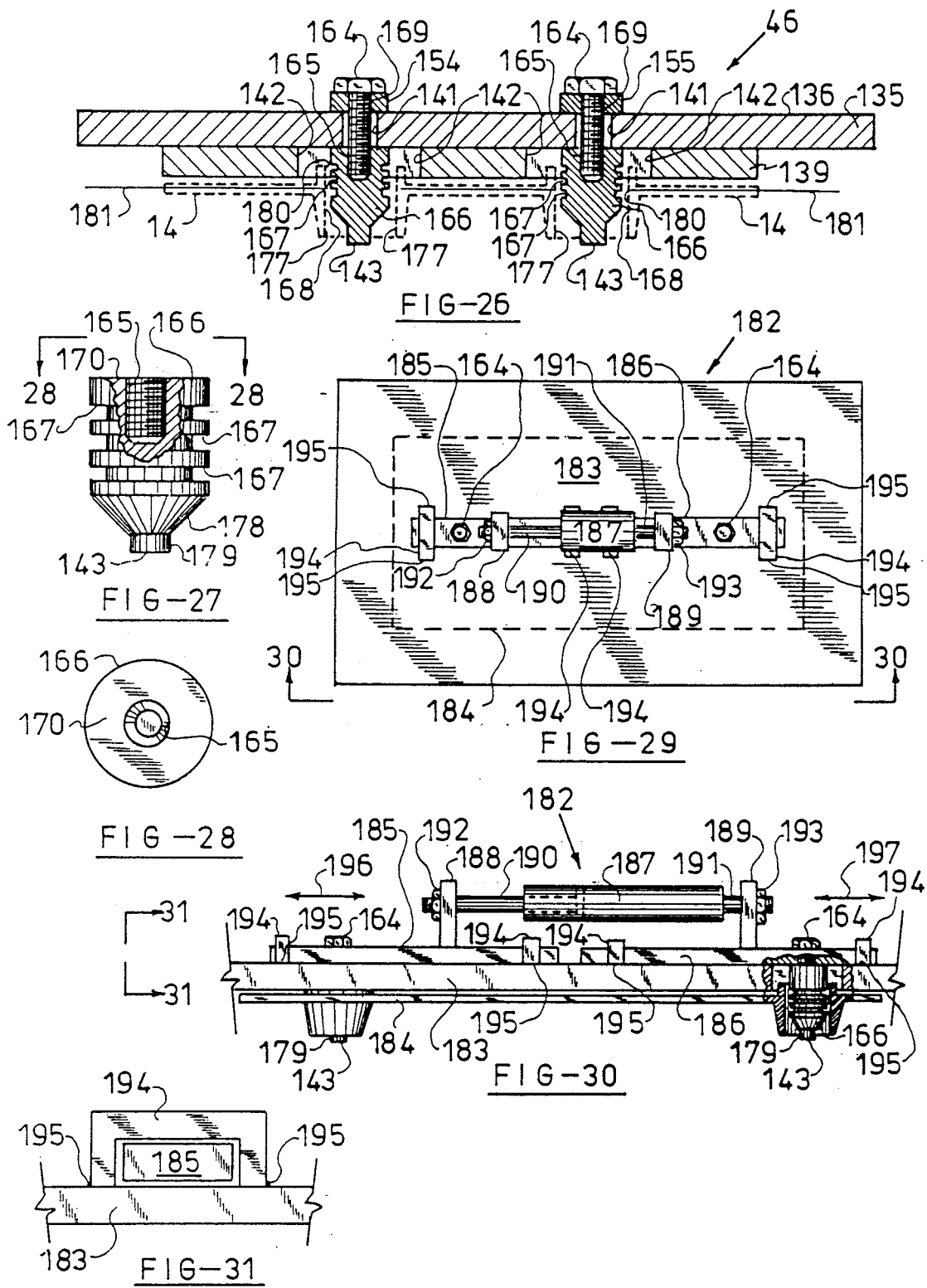

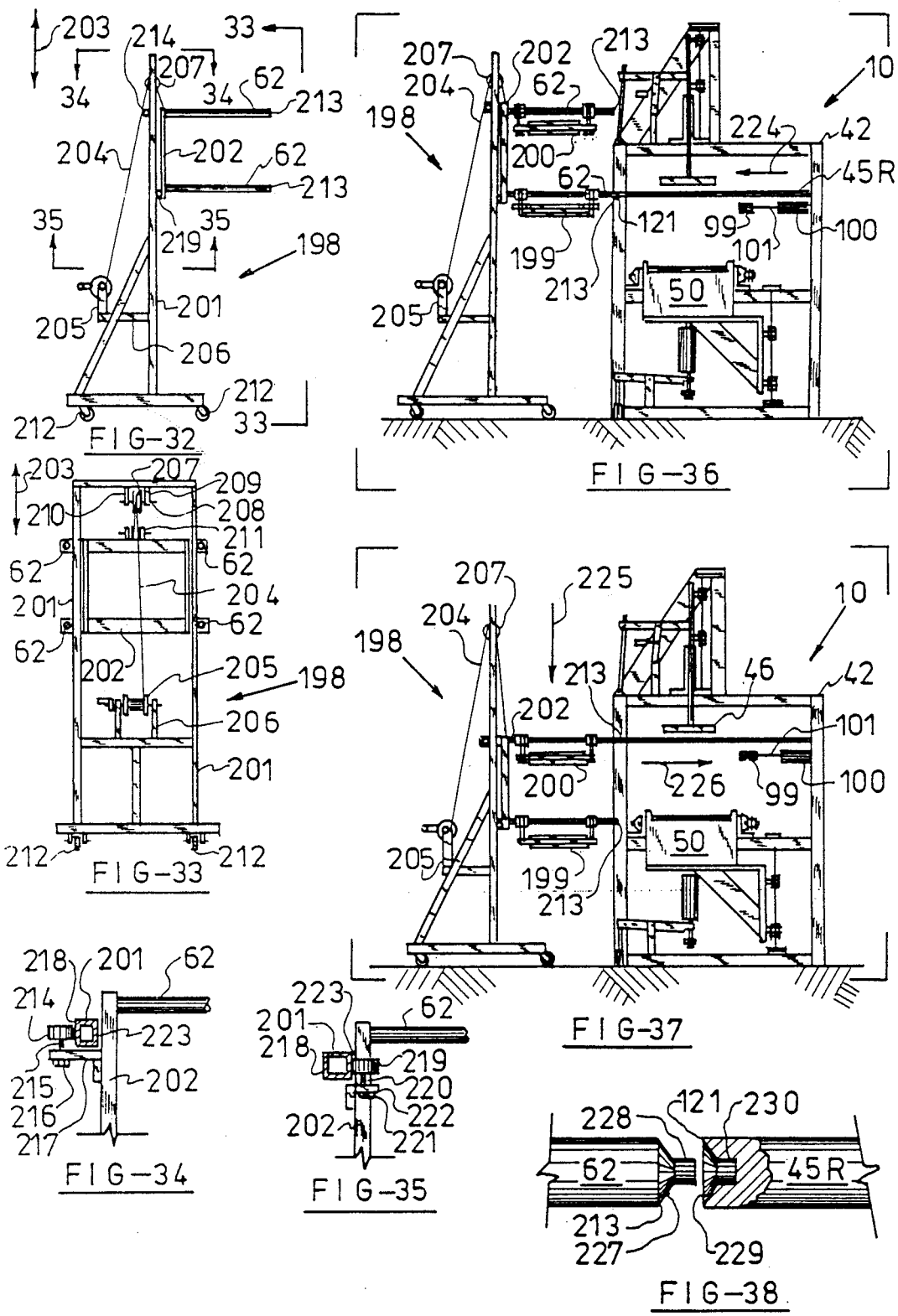

BATTERY HEAT SEALING MACHINE AND METHOD

BACKGROUND OF THE INVENTION

This invention relates generally to a heat sealing machine and in particular to a new and novel battery heat sealing machine.

Automotive battery shells or containers, until the 1960's traditionally were made of a rubber composition and contained a top cover over each cell in the battery. The multi-cover top cover then evolved into a one-piece cover which covered all the battery cells at once. In later batteries, the one-piece top cover was sealed with an epoxy glue to the lower battery container.

Various machines were designed during this time to assemble the various battery components, such as battery plates and separators, together into a complete battery. Several such machines are shown in the U.S. Pat. No. 1,932,136, issued on Oct. 24, 1933 to W. W. Hole and in the U.S. Pat. No. 2,324,523, issued on July 20, 1943 to A. D. Lund. Later developed assembling machines are shown in the U.S. Pat. No. 4,507,856, issued to E. J. Pearson on Apr. 2, 1985 and in the U.S. Pat. No. 4,509,252, issued to A. Sabatino et al on Apr. 9, 1985.

During the 1960's, battery containers were introduced to the market with the container being made of a copolymer of propylene and ethylene and other constituents. The copolymer container was lighter in weight than the rubber container and had thin walls. This construction permitted larger internal dimensions for a given outside dimension of the container. Another improved feature of the copolymer container was that it had a better impact resistance than the previous rubber container.

The sealing of batteries during this period and in the early 1970's took many forms as typified by the U.S. Pat. No. 3,427,205, issued on Feb. 11, 1969 to K. F. Plitt et al and in the U.S Pat. No. 3,544,383, issued on Dec. 1, 1970 to J. E. Oltman. Another approach to battery sealing of the top cover is shown in the U.S. Pat. No. 3,629,010, issued to L. W. Hahn on Dec. 21, 1971 which uses a low viscosity sealant material. In addition, machines were soon developed to automatically install the covers on the battery container as shown in the U.S. Pat. No. 4,306,355 issued to S. Hawrylo et al on Dec. 22, 1981.

Development of other advantageous construction arts followed after the change to the copolymer composition for the battery container. Included in these developments were (1) thru-the-partition connections and (2) heat seal bonding of the top cover to the battery container. The thru-the-partition connection is a connection between adjacent battery cells through a hole in the partition wall that divides the cell enclosures. This type connection eliminated obstructions to the entire top of the container after which it became possible to heat seal the top cover to the battery container by heating the mating surfaces of the top cover and the upper periphery and partitions of the battery container.

The heat seal bonding technique required the heating of the top cover and the upper portions of the battery periphery and the partitions to a softened or near liquid state. After this, the mating parts were placed together with just the right pressure to bond the two pieces together The seal was accomplished within seconds and the use of epoxy glue with its accompanying worker health problems, was eliminated. In addition, the additional expense and cleanup problems associated with epoxy glue was also eliminated.

Heat sealing quickly became the dominate sealing method in the battery industry and the device or machine used to heat and melt the mating surfaces and to seal them together is known as a "Heat Seal Machine" in the battery industry. These machines have been commonly used in the industry for about the last two decades starting in the early 1970's and running through the 1980's to the present.

An example of a fusion or thermo bonding is shown in the machine typified by the U.S. Pat. 3,909,301, issued on Sept. 30, 1975 to R. L. Schenk, Jr. and in the U.S. Pat. No. 3,909,300, issued to R. L. Schenk, Jr. et al on the same date. A further example of these types of heat sealing machines is the U.S. Pat. No. 3,908,743, issued to R. L. Schenk, Jr. et al on Sept. 30, 1975 and the U.S. Pat. No. 3,908,738, issued to J. A. Bruzas et al on the same date.

Later developments in battery sealing of various parts of the battery are shown in the U.S. Pat. No. 4,091,189, issued to A. Farwer et al on May 23, 1978 and in the U.S. Pat. No. 4,186,246, issued on Jan. 29, 1980 to R. K. Sugalski. In a similar manner, the U.S. Pat. No. 4,252,873, issued to J. Epstein et al on Feb. 24, 1981 teach further efforts at improving sealing in a batter. A universal seal for use in a lithium battery is shown in the U.S. Pat. No. 4,603,095, issued to B. Bowsky on July 29, 1986 and a further type of battery seal is shown in the U.S. Pat. No. 4,567,121, issued on Jan. 28, 1986 to A. Gilmour. A cylindrical storage cell seal is shown in the U.S. Pat. No. 4,656,736, issued on Apr. 14, 1987 to N. Volkhin et al.

As inventions in heat seal bonding developed, continuous machines emerged such as the rotary device shown in the U.S. Pat. No. 3,873,400, issued to T. Tsuchida et al on Mar. 25, 1975 and the rotary machine shown in the U.S. Pat. No. 4,502,213, issued on Mar. 5, 1985 to J. A. Madden et al. Other types of improved heat seal machines were developed, in the early 1980's, as shown in the U.S. Pat. No. 4,221,626, issued on Sept. 9, 1980 to B. J. Clay and in the U.S. Pat. No. 4,310,376, issued on Jan. 12, 1982 to R. Ebina et al. Separate heaters were tried in the U.S. Pat. No. 4,525,923, issued July 2, 1985 to O. E. Alvarez and opposing pivoted platen structures was attempted in the U.S. Pat. No. 4,596,625, issued on June 24, 1986 to the same inventor.

The introduction of copolymer battery containers during the 1960's also resulted in later machine developments centered around heating of the mating components. The use of a single heating element for both the top cover and the battery container was attempted as early as Apr. 29, 1969 as shown in the U.S. Pat. No. 3,441,448, issued to B. P. Hayward et al on that date. This patent on a single station device did not disclose details on the heater but emphasized the use of different forces to complete sealing and the use of separate heaters for the mating surfaces. While these patents illustrate the early attempts at heat sealing, they also show the lack of knowledge of the problems to be encountered with heat seal bonding when using heated platens. Early designs of platens used multi-piece platens with two separate heat conducting surfaces which were attached to the heater plate.

During extended use of the platen, a corrosion would occur between the separate pieces of the platen or the separate pieces would warp with repeated heating and cooling. As a result, the uniform transfer of heat was inhibited and/or the even melt of the top cover on the battery container top surface would be effected because of the warp. Compensation for warp of the separate pieces of the platen in an attempt to obtain uniform heat transfer resulted in various complicated mechanisms in the heat seal machine such as shown in the U.S. Pat. No. 3,627,617, issued to E. G. Schaumburg on Dec. 14, 1971 and in the U.S. Pat. No. 3,686,056, issued on Aug. 22, 1972 to R. M. Fiandt.

Other heating platen designs have been tried such as using platens of three levels which are common today. These consist of the center piece containing the electric heating elements with a top and bottom sub-platen made to contour to the top cover and the battery container respectively. The top and bottom sub-platens of this design transfer heat from the center piece. However continual usage of this type of a three-piece platen causes warpage and/or corrosion between the pieces and the heat transfer in the platen becomes uneven.

Comb shaped heating devices such as taught in the U.S. Pat. No. 3,778,314, issued on Dec. 11, 1973 to S. Kano et al, have even been tried along with infrared heating, such as shown in the U.S. Pat. No. 3,883,369, issued on May 13, 1975 to J. P. Badger et al in order to overcome problems in heating and softening the mating pieces on the battery.

SUMMARY OF THE INVENTION

While the before described prior art devices have operated with varying degrees of success, the applicants' novel heat seal machine and method represent an advancement of the art. A one-piece platen is used with the platen being designed with a central core having formed therein a plurality of openings, spaced apart from each other. The openings are used to receive a plurality of heaters and the thermocouple used in the platen. An integral external heating surface is formed on top of the central core and another integral external heating surface is formed on the bottom of the central core. These heating surfaces are used for heating the cover and the battery container and serve to transfer the heat from the heaters.

This novel design eliminates the before described corrosion and warpage common with multi piece platen designs and provides for uniform heat transfer to the cover and the battery container.

Unique thermal growth means are provided in the unique platen travel design which reduce stress and forces on the platen bearings and on the heat seal machine structure as the platen expands and contracts upon use. The unique platen design is incorporated in a novel heat seal machine which also has a new and novel type of top cover holding device. The machine also contains a new and unique design for changeover tooling where the platen and top cover holder can quickly and easily be changed.

A novel mobile carrier also has been designed to quickly receive the outgoing platen and to install the incoming platen resulting in a safe method of platen exchange when both platens are hot and ready for use. The novel method hereinafter described uses the novel platen design to provide a much improved heat sealed battery.

Accordingly it is an object and advantage of the invention to provide a novel battery heat seal machine and method of operation of the machine with the machine having a novel one-piece platen design which eliminates corrosion and warpage of the platen.

Yet another object and advantage of the invention is to provide a novel platen design that has provisions for thermal growth that reduces bearing stress on the platen bearings and on the heat seal machine supporting structures.

Still another object and advantage of the invention is to provide a new and unique top cover pickup device for use on the heat seal machine.

A further object and advantage of the invention is to provide a new and novel platen design and support in the heat seal machine that permits the quick and easy change of the platen with a new and novel mobile carrier that is used with the heat seal machine.

These and other objects and advantages of the invention will become apparent from a review of the drawings and from a study of the preferred embodiment describing the invention by way of illustration only.

BRIEF DESCRIPTION OF THE DRAWINGS

FIG. 1 is a perspective view of the applicants' unique battery heat sealing machine.

FIG. 2 is a diagrammatic view of the steps of the method disclosed herein.

FIG. 3 is an upstream elevational view, taken along lines 3—3 of FIG. 1, showing the basic internal components of the applicants' machine.

FIG. 4 is a side elevational view, taken along lines 4—4 of FIG. 1.

FIG. 23 is a perspective view of the top of the top cover holding device used in the applicants' machine.

FIG. 24 is a perspective view, taken along lines 24—24 of FIG. 23 and showing the bottom surface of the top cover holding device rotated approximately 90° from the view of FIG. 23.

FIG. 25 is a cross-sectional elevational view, taken along lines 25—25 of FIG. 23.

FIG. 26 is a cross-sectional elevational view, taken along lines 26—26 of FIG. 23 showing a top cover in dashed lines with fingers positioned in the top cover holes.

FIG. 27 is an enlarged side view of the pickup fingers used in the top cover holding device of FIGS. 23-31.

FIG. 28 is a top plan view, taken along lines 28—28 of FIG. 27.

FIG. 29 is a top plan view of a modified top cover holding device using two pickup fingers.

FIG. 30 is a side elevational view, taken along lines 30—30 of FIG. 29 showing the modified top cover holding device in position on a top cover.

FIG. 31 is an end elevational view, taken along lines 31—31 of FIG. 30.

FIG. 32 is a side elevational view of the novel heating platen transfer device used with the applicants' machine.

FIG. 33 is a front view, taken along lines 33—33 of FIG. 32.

FIG. 34 is a partial plan view, taken along lines 34—34 of FIG. 32.

FIG. 35 is a partial plan view, taken along lines 35—35 of FIG. 32.

FIGS. 36-37 are two side views, similar to the view of FIG. 3 showing how the novel heating platen transfer device is used to transfer platens out of and into the battery heat sealing machine.

FIG. 38 is a side elevational view, partially broken away, showing a modification of the ends of the platen support rods.

DESCRIPTION OF THE PREFERRED EMBODIMENT

Figure 5:
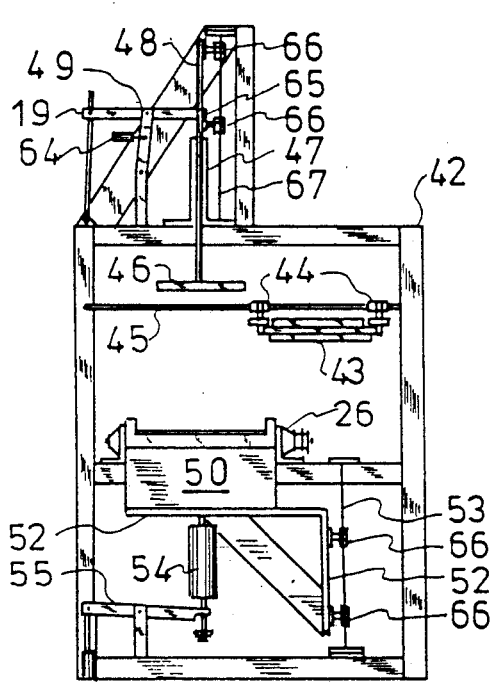
FIGS. 5-12 are side elevational views, similar to the FIG. 3 view, showing the various positions of the internal components during operation of the machine.

Referring now to the drawings in general and in particular to FIG. 1 of the drawings there is shown generally by the numeral 10 the applicants' unique battery heat seal machine which is positioned downstream from an inlet conveyor 11 and upstream from an outlet conveyor 12. The inlet conveyor 11 transports battery containers 13 with their internal components positioned inside along with a battery top cover 14 which is loosely positioned on top of the container 13. The unsealed batteries thus move downstream, in the direction shown by the arrow 15 into the applicants' novel machine 10 and exit the machine, as a sealed battery 16, with the top cover 14 sealed to the container 13.

The heat seal machine 10 contains a transparent front cover 17 for viewing the operation of the machine and for opening to change the novel platen as will be described when referring to FIGS. 32-38. A top cover melt stop mechanism rod 18 is fixed to the frame supporting structure and is attached to the arm 19 extending into the cover 20 which encloses the top cover melt stop mechanism. A rear cover 21 encloses the rear portions of the novel machine and an expanded metal guard 22 is positioned over the entrance and exit to the machine for worker protection. A lower expanded metal guard 23 protects the front portion of the machine below the hinged transparent front cover 17.

A control panel 24, having a plurality of operating push buttons 25, is conveniently located on the right side of the machine as shown.

Positioned inside the machine 10 and attached to the supporting structure of the machine frame is a machine conveyor 26 which is in-line with the inlet conveyor 11 and the outlet conveyor 12. A plurality of guide rails 27 are attached on both sides of the inlet conveyor 11 as well as the outlet conveyor 12 with the inlet conveyor 11 being supported by a plurality of legs 28 and with the outlet conveyor 12 being supported by a plurality of legs 29.

Turning now to FIG. 2 of the drawings along with FIGS. 3-12 of the drawings there will be described in brief detail the operation of the applicants' unique machine and the method hereinafter claimed. This will enable the reader to more clearly understand the novel elements of the machine to be described in detail later.

The novel method and operation of the machine 10 to heat seal the battery top cover 14 to the battery container 13 comprises the steps of providing the novel machine 10 shown in FIG. 1 having the conveyors 11, 12 and 26 before described, for moving battery containers with loose unsealed top covers positioned thereon. The novel machine 10 also has means for raising and lowering the battery container and has a unique top cover holding device 46 shown in FIGS. 23-31 of the drawings, for raising and lowering the top cover 14 at predetermined times. The novel machine 10 is provided with a unique one-piece heating platen 43, shown in FIGS. 13-18 which also has a unique two-directional thermal growth feature, shown in FIGS. 19-22. The particular construction of the novel platen 43 permits the lower portion of the top cover 14 along with the upper portion of the battery container 13 to be simultaneously heated and for the platen 43 to be moved out of its heating position and also for the platen 43 to be quickly replaced by another platen of different size when using the applicants' novel heating platen transfer device shown in FIGS. 32-38 of the drawings.

The novel machine 10 is also provided with means to heat the platen and to control the operation of the various movable parts of the machine at predetermined times and in a predetermined sequence using known electrical components and circuitry forming no part of this invention. These before described items are the first step as shown in FIG. 2 as the numeral 30.

The next step in the operation of the machine and the method, shown as the numeral 31 is to make the machine ready by positioning the movable parts of the machine in a predetermined position. FIGS. 5-12 show the operation of the machine in a sequence with FIGS. 3 and 4 showing the inside features of the machine and some of its novel features.

Before describing further operation of the machine, reference should be made to FIGS. 3 and 4 which show the internal components of the machine with the views being taken respectively along lines 3—3 and 4—4 of FIG. 1. The supporting structure of the frame is shown as the numeral 42 and supports the novel one-piece heating platen 43 which is slideably mounted on four 1¼ inch diameter linear bearings 44 which slide on a pair of 1¼ inch diameter rods 45, the mounting of which will be described hereinafter when referring to FIGS. 19-22 of the drawings. The unique top cover holding device 46 is raised and lowered by a top cover cylinder 47 which moves a pair of lifting plates 48 mounted to a plurality of 1½ inch diameter linear bearings 66 moving on 1½ inch diameter rods 67 as will be more fully described hereinafter. A top cover melt stop mechanism 49 is used to control the depth of the melting of the top cover by controlling the distance that the top cover lifting device can travel.

The top cover lifting device 46 is designed to move upwardly and downwardly as shown by the arrows 58 and 59 while the heating platen 43 is designed to move inwardly and outwardly as shown by the arrows 60 and 61. The heating platen 43 can also be moved completely outside of the machine onto the platen changing rods 62 shown in FIG. 3 as desired during changeover of the platen.

Referring now to the lower portions of the machine in FIGS. 3 and 4, there can be seen in FIG. 4 more detail of the machine conveyor 26 which has a plurality of spaced apart conveyor rollers 51 as known in the conveyor art. A plurality of elongated battery lifting bars 50 are positioned between the rollers 51 and are welded at their lower end to a braced L-shaped lift bar frame 52. The braced L-shaped frame 52 has mounted thereon a plurality of 1½ inch diameter linear bearings 66 which ride on the 1½ inch diameter vertical rods 53.

A lift bar cylinder 54 is mounted as shown and functions to lift the L-shaped frame 52 upwardly and downwardly in the direction shown by the arrows 56 and 57. The container melt stop mechanism 55 controls the distance that the fingers 50 can move to in turn control the melting depth of the top surface of the battery container 13 as it is positioned against the heating platen 43.

The lift bar cylinder 54 for raising the battery container has a 5 inch diameter cylinder which also operates at 100 psi. The entire structure 52, with the fingers 50 for lifting the battery container 13 weighs approximately 200 pounds and is guided by the linear bearings 66 riding on the vertical rods 53 which have a 1½ inch diameter. The linear bearings 44 and 66 used in the applicants' device may be the type manufactured by Thompson Industries, Inc. of Manhasset, New York 11030. The linear bearings 44 used for supporting the platen 43 would be the Part Number PBO-20-OPN which are 1¼ inch diameter. The linear bearings 66, which are used in the top cover lifting device 46 and in the battery lifting device L-shaped frame 52, are 1½ inch diameter and would be the Part Number PB-24-ADJ. Other types of linear bearings may also be used within the spirit and scope of the invention.

Referring now to the upper portion of the machine in FIGS. 3 and 4 the top cover lifting cylinder 47 is a 3 inch diameter cylinder and is air operated at a pressure of 100 psi. A smaller air cylinder 64 of 1½ inch diameter operates at the same air pressure and retracts the stop bars 65 to allow the top cover holding device 46 to go down to the battery container 13 to pick up the top cover 14 and to replace the top cover as will be described in detail later.

While the lifting mechanisms of the lifting devices for the battery container 13 and the top cover 14 have been briefly described, the novel features of the top cover lifting device will be more fully described hereinafter when referring to FIGS. 23-31 of the drawings as well as the unique features of the one-piece heating platen 43 with its thermal growth features shown in FIGS. 13-22.

Returning now to FIG. 2 and to FIGS. 5-12 of the drawings, there will be continued the description of the operation of the machine and method now that the reader has a basic grasp of the internal parts of the novel machine. In the start of operation of the applicants' invention, as before described, the machine is made ready for operation, in step 2, shown by the numeral 31, by positioning the various parts in their predetermined starting position. This is shown in FIG. 5 with the heating platen 43 moved out of line to the right and with the top cover holding device 46 moved upwardly and also with the battery lifting device L-shaped frame 52 moved downwardly. The platen 43 is moved by a pair of cylinders, not shown in FIG. 5, which will be described more fully hereinafter when referring to FIGS. 13-14 and 18.

Figure 6:
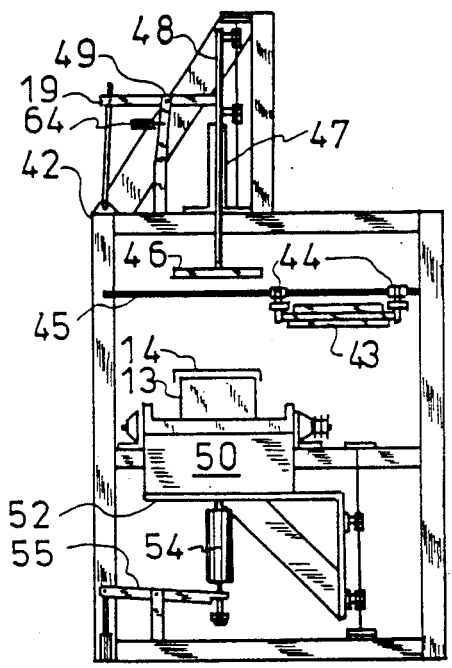
Figure 7:
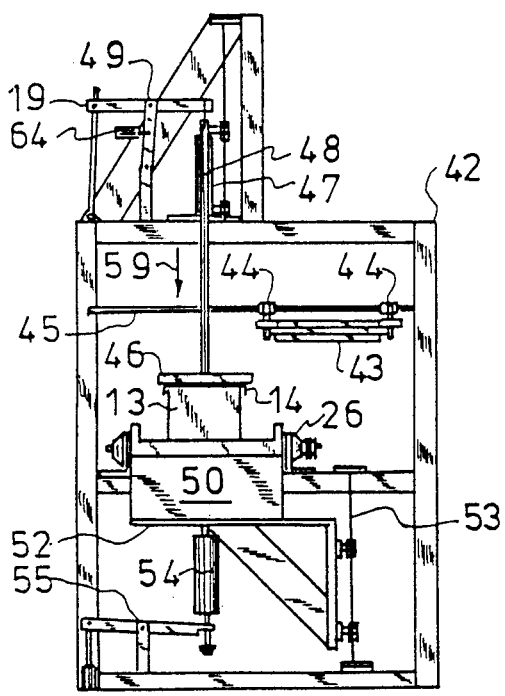

The next step 3 in the operation of the machine, shown by the numeral 32 in FIG. 2, is the moving of the battery container 13 with its loose unsealed top cover 14 in place on top of the container 13. This is shown in FIG. 6 and may be done manually or automatically by known feeding means in the conveyor art. Step 4 in the machine operation, shown by the numeral 33, consists of raising the loose top cover 14 from the battery 13 by lowering the top cover holding device and picking up the top cover with the novel holding device, shown in FIGS. 23-31. This can be seen partly in FIG. 7 where the top cover holding device has been lowered, in the direction of the arrow 59, and can then be seen partly in FIG. 8 where the holding device 46 has been raised upwardly in the direction of the arrow 58 until it is positioned above the heating platen 43.

Figure 8:
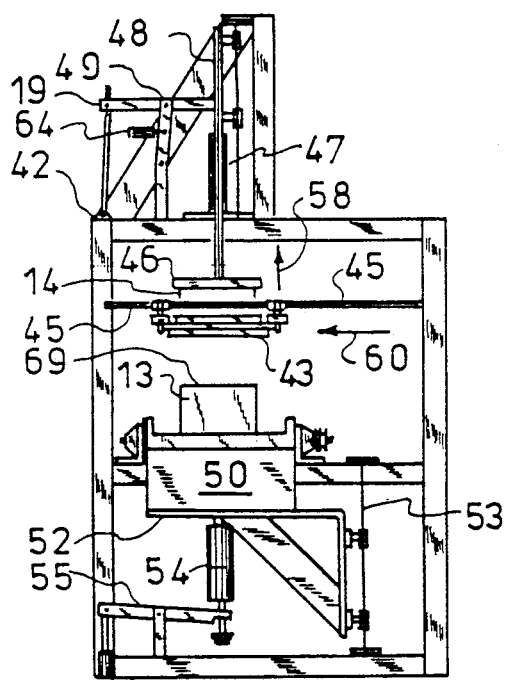

After the holding device 46 has moved above the platen 43, then the platen is free to be moved into its heating position. This is step 5 in the machine operation and is shown by the numeral 34 in FIG. 2. The platen 43 is moved inwardly in the direction of the arrow 60 into position above the battery container 13 and below the top cover 14 held by the top cover holding device 46. FIG. 8 shows the position of the respective parts at the end of step 4 and at the end of step 5 of the method.

Figure 9:
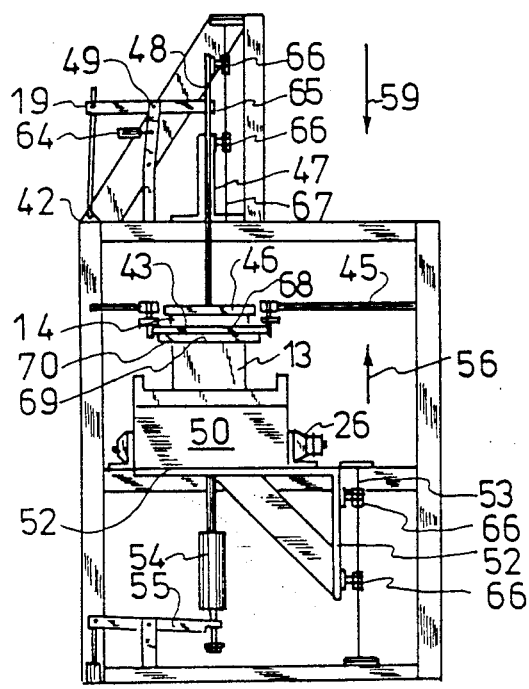

FIG. 9 then represents the step 6, shown as numeral 35 in FIG. 2, where the top cover holding device 46 would again be moved downwardly, in the direction of the arrow 59, to contact the upper surface 68 of the heating platen. The battery container 13 would also be raised upwardly, in the direction of the arrow 56, until its upper surface 69 contacts the lower surface 70 of the one-piece heating platen 43. FIG. 9 shows how the battery lift bars 50 are in an upward position as the air cylinder 54 is extended and also how the top cover 14 has been moved downwardly in the direction of the arrow 59 by the holding device 46. The top cover melt stop 49 can be set to control the depth of the melt of the top cover and the container melt stop 55 can also be set to control the depth of the melt of the top surface 69 of the container 13. This is done normally at the start of a sequence of runs of batteries and top covers of one size and will be changed as different sizes and types of batteries are run through the machine 10.

FIG. 9 also represents step 7, shown by the numeral 36 in FIG. 2, which is the heating of the platen to soften the underside of the top cover 14 and the upper side 69 of the battery container 13. While the heating times and temperatures may vary somewhat, a typical time for application of the heating platen 43 to the top cover and the battery container would be approximately 4 seconds at a platen temperature of 750° F. This will adequately soften the underside of the top cover 14 and the top surface 69 of the battery container 13 so that they can be later positioned together as will be described.

Figure 10:
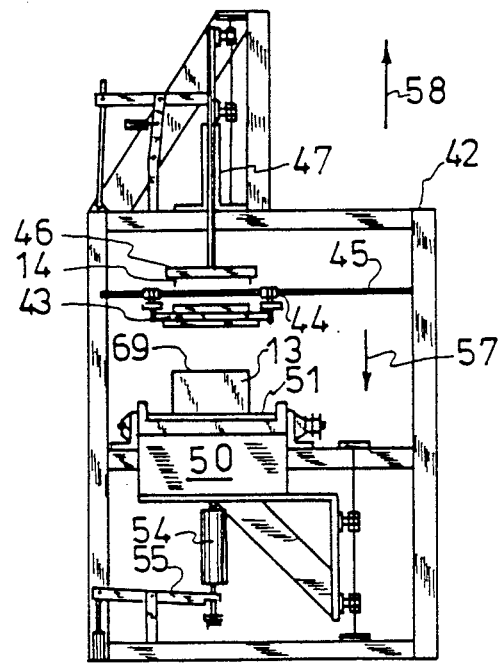

After the appropriate heating time, the next step 8 in the operation, shown by the numeral 37 in FIG. 2 occurs, which is separating the heated top cover 14 and the heated battery container 13 from the one-piece heating platen 43. This is shown in FIG. 10 where it can be seen how the top cover holding device 46 has again been raised upwardly in the direction shown by the arrow 58 to clear the heating platen 43 so that it can be moved out of line in the next step. The raising of the top cover holding device is again accomplished by actuating the top cover cylinder 47. At the same time, the lowering of the heated battery container in the direction of the arrow 57 is also accomplished by activating the lift bar cylinder 54 as before described in the opposite direction to lower the container 13. The heated battery container 13 is moved to its lowest position as shown in FIG. 10 so that the battery now sits on top of the conveyor rollers 51.

Figure 11:
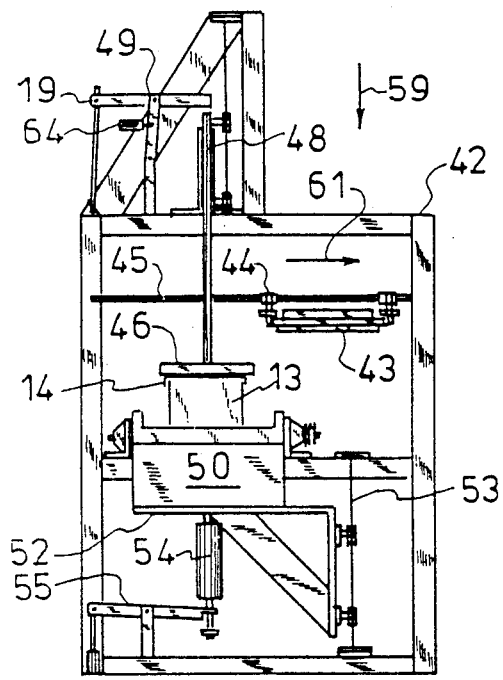
Figure 12:
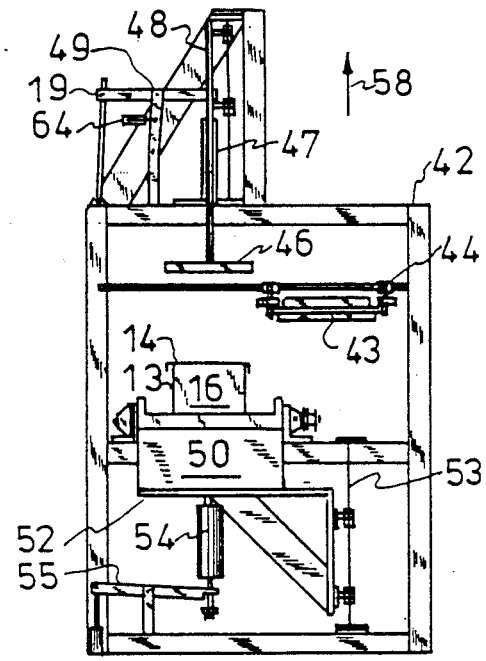

Step 9 as shown by the numeral 38 in FIG. 2, then comprises moving the heating platen 43 out of line in the direction shown by the arrow 61 in FIG. 11 while Step 10, shown by the numeral 39 in FIG. 2, comprises moving the heated top cover 14 down onto the heated battery container 13. FIG. 11 also represents step 10 where it can be seen that the top cover holding device 46 has been moved downwardly in the direction shown by the arrow 59. The heated top cover 14 is held in place on the heated battery container surface 69 for a predetermined time until the top cover is sealed to the battery container as the two surfaces cool down and solidify.

Step 11, shown by the numeral 40 in FIG. 2, would then comprise moving the top cover holding device 46 upwardly in the direction of the arrow 58 away from the sealed battery. This is accomplished by releasing the top cover 14 as will be described later and moving it upwardly into the position shown in FIG. 12 where it is above the line of the heating platen 43 so that the platen can be moved again for the next battery.

The last step 12, shown as the numeral 41 in FIG. 2, comprises moving the sealed battery 16 out of the machine 10 downstream on the outlet conveyor 12 in the direction of the arrow 15 shown in FIG. 1. This can be accomplished either manually or automatically as desired with known techniques in the conveyor art. As before described, one of the unique features of the applicants' machine 10 is the use of the novel one-piece heating platen 43 which will now be described in detail referring to FIGS. 13-18.

Figure 13:
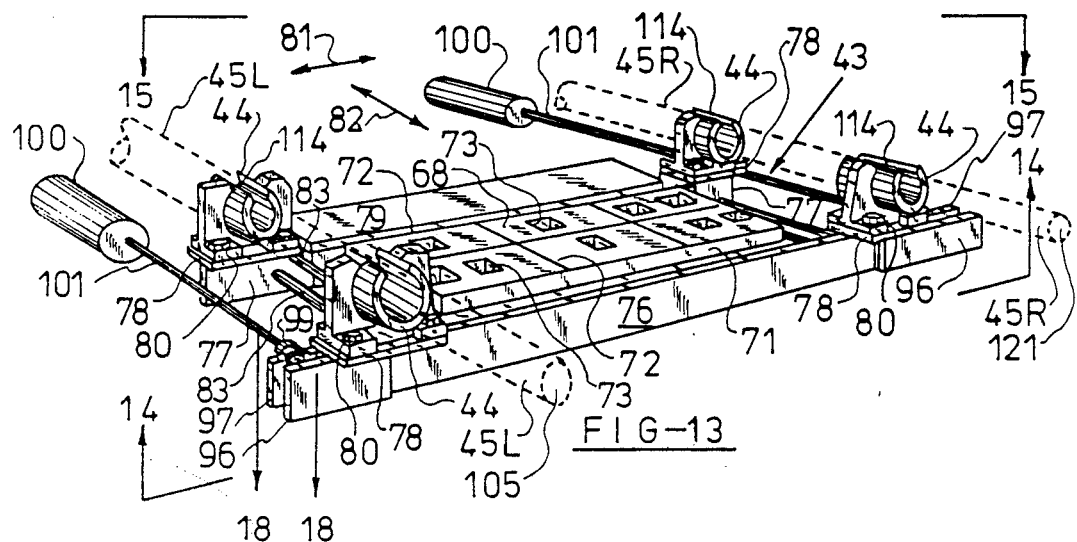
FIG. 13 is a perspective view, taken from the front of the applicants' machine, looking along line 4—4, showing in detail the novel heating platen and its supporting structure.

FIG. 13 is a perspective view taken from the front of the applicants' machine, looking along line 4—4 of FIG. 1, and showing in detail the novel heating platen 43 which is carried on horizontal rods 45. These rods are shown in FIG. 13 in dashed lines and have been numbered 45L for the left rod and 45R for the right rod. As before described, prior art heating platens are generally formed in multi-pieces, that is with several separate heating surfaces which are joined together on each side of a central area where heaters are positioned. Because of the multi-piece structure, the prior art heaters had corrosion and warpage problems due to the multi-pieces with uneven heat transfer.

The applicants' unique heating platen eliminates these problems by being constructed, in the preferred embodiment, of a one-piece aluminum core 71 with an upper heating surface 68 and a lower heating surface 70 formed on the central core 71. The upper platen surface 68 will then heat the lower surface of the top cover 14 while the lower platen surface 70 will heat the upper surface of the battery container, which is shown as number 69 in FIGS. 8-9. The central core 71 has formed therein at least two holes 75 for receiving the external terminals of the battery and may have a more or less number of holes depending on the type of battery.

Figure 14:
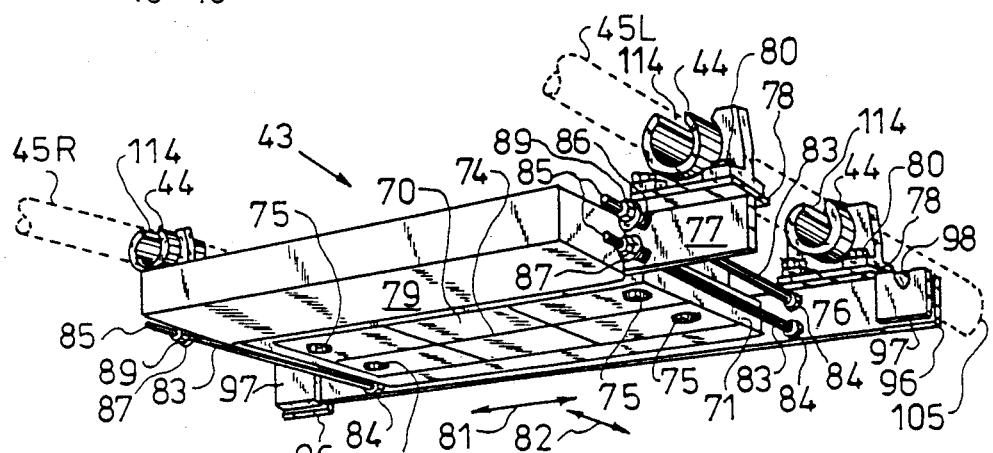
FIG. 14 is a perspective view of the lower surface of the platen, taken 180° from the view of FIG. 13 and looking outward from the inside of the applicants' machine toward the front of the machine.

FIG. 13, which is a perspective view of the upper platen surface 68, also shows a platen structure which may have a plurality of spaced protuberances 72 and indentations 73 designed to conform to the particular top cover structure used in a given battery. FIG. 14, which shows the lower platen surface 70, is a perspective view taken 180° from the view of FIG. 13 and looks outward to the front from the inside of the machine 10. It can be seen in FIG. 14, how a typical platen 43 may also contain protuberances 74 to conform to the particular battery size and type to be heated.

In the applicants' unique platen 43, the entire platen is designed to be able to be quickly changed from one size to another when changing battery sizes and types on the assembly line. To accomplish this, a plurality of linear bearings 44 of the type described are mounted on top of vertical elongated plates 76 and 77 and on top of horizontal plates 78. A plurality of bolts and nuts 80 are used to mount the linear bearings 44 to the plates 78 and the protective shield 79 is mounted on the elongated plate 77. The protective shield 79 covers the wiring for the heaters and the thermocouple used in the platen as will be later described.

In the applicants' novel design, the one-piece platen 43, with its linear bearings 44, may be changed as a unit which is timesaving because the platen, when replaced, is level as before and the alignment on the horizontal X and Y axis of the platen are the same as when removed. The changeover of the platen is quickly accomplished by the novel platen transfer device shown in FIGS. 32-38 to be described hereinafter. Prior art platen changeover designs would change the platen on its carrier which would require shims and leveling of the new platen, after a change of tooling. The applicants' novel design using a rod hung platen as shown with the linear bearings 44 and the novel platen transfer device is far superior over prior art devices, by giving immediate alignment and leveling of the platen on changeover.

The unique one-piece platen 43 is designed with thermal expansion means, which is associated with the mounting means to permit thermal growth of the platen central core 71 in two lateral directions as the core is heated. It can be seen how the core can grow in the long direction shown by the arrow 81 and in the short direction shown by the arrow 82. The normal thermal growth or expansion of the platen normally will be approximately $\frac{1}{8}$ inch per foot of length during the heating of the platen. If a typical platen were 20 inches long and 12 inches wide of the type as shown in the FIGS. 13-14, then the platen growth in the long dimension shown by the arrow 81 would be approximately $\frac{1}{4}$ inch. In a similar manner, the thermal growth in the shorter dimension, shown by the arrow 82, would be approximately $\frac{1}{8}$ inch for the platen shown.

The thermal expansion means to permit growth in the short dimension, shown by the arrow 82, is accomplished by the use of four threaded elongated rods 83 which are positioned in holes, not shown, and are fixedly attached to the elongated plate 76 by a plurality of nuts 84. The other end 85 of the rods 83 are spring biased by a plurality of springs 86. The elongated rods 83 are positioned through a plurality of holes, not shown, in the elongated plate 77, and a washer 87 is used to ground one end of the spring 86 with the other end being grounded on the surface 88 of the plate 77. A nut 89 is threaded on the threaded end 85 of the rods 83 and retains the springs 86 on the rods.

When formed thusly, the thermal expansion means in the short distance of the platen 43, shown by the arrow 82 is accomplished without any stress on the linear bearings 44 which are free to ride on the elongated rods 45L and 45R. Stress is also removed from the supporting structure of the machine frame.

Figure 15:
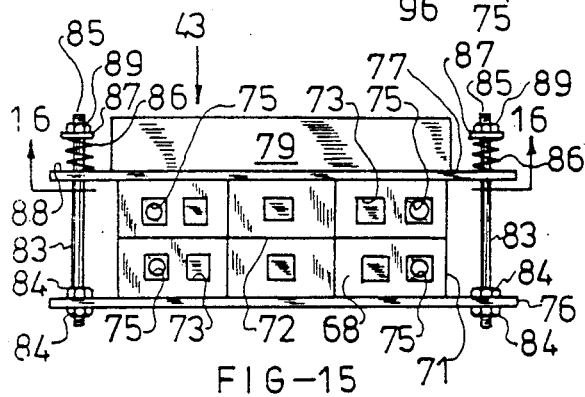
FIG. 15 is a reduced top plan view, taken along lines 15—15 of FIG. 13.
Figure 17:
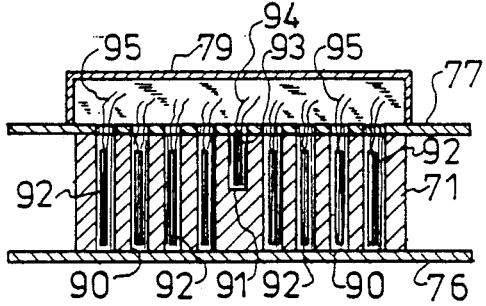
FIG. 17 is a cross-sectional plan view, taken along lines 17—17 of FIG. 16.
Figure 16:
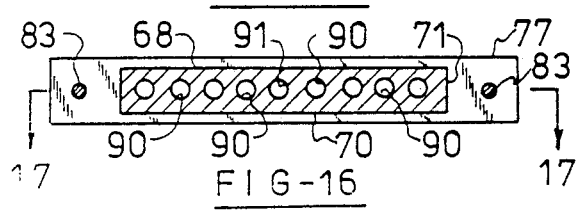
FIG. 16 is a cross-sectional elevational view, taken along lines 16—16 of FIG. 15.

The thermal expansion means in the long dimension of the platen, shown by the arrow 81 will be discussed hereinafter when referring to FIGS. 19-22. Before that, further details of the novel platen will be given as shown in FIGS. 15-17 of the drawings. FIG. 15 is a reduced top plan view taken along lines 15—15 of FIG. 13 and shows in more detail the thermal expansion in the short distance along the width of the platen. There can also be more clearly seen the protective shield 79 fastened by known means in the art to the elongated plate 77.

FIG. 16 is a cross-sectional view, taken along line 16—16 of FIG. 15, and shows the internal construction of the central core 71 of the platen. A plurality of holes 90 are formed through the core 71 by drilling or other known means and are used to hold the heater elements 92 which are positioned in the holes. In the core shown, eight holes 90 would be drilled, with four holes positioned on each side of a shorter hole 91. A thermocouple 93 is positioned in the shorter hole 91 and has its lead wires 94 positioned inside the protective shield 79. The lead wires 95 for each heater are also positioned inside the protective shield 79. These wires then are wired into the heater circuit as known in the art and into the main circuit and the control panel for the machine 10.

The cartridge heaters 92, of known types in the art, may vary from 6 to 12 depending upon the type of platen used for the various types of batteries. Accordingly the holes 90 would also vary in the different platen designs. The cartridge heaters 92, in the embodiment shown, would be sized at 700 watts each and would be 240 volts wired in single phase. The position of the cartridge heaters 92 and the thermocouple 93 in the holes 90 and 91 can be seen in FIG. 17 which is a cross-sectional view, taken along lines 17—17 of FIG. 16. The heaters and the thermo-couple have not been shown in FIG. 16 for purposes of clarity.

The horizontal movement of the unique one-piece heating platen on the rods 45L and 45R is shown most clearly in FIGS. 13 and 14 of the drawings. A pair of spaced apart plates 96 and 97 are fixedly attached to each end of the elongated plate 76 by a plurality of bolts, not shown in the drawings or by known fastening means. A semicircular notch 98 is formed in each plate 97 as can best be seen in FIG. 14.

Figure 18:
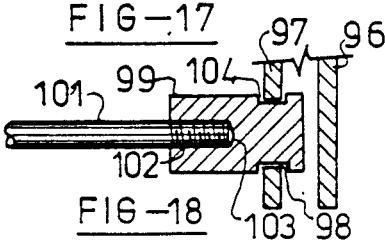
FIG. 18 is a cross-sectional plan view, taken along lines 18—18 of FIG. 13.

The platen is moved on the rods 45L and 45R, in the direction shown by the arrow 82, by a pair of platen air cylinders 100 which are attached to the supporting frame of the machine, not shown, and are connected to the air supply of the machine and controls by means known in the art. Each cylinder 100 has a cylinder rod 101 which extends to the platen and is screwed into the platen attachment device 99. The attachment device is shown in FIG. 18 which is a cross-sectional view, taken along line 18—18 of FIG. 13. The cylindrical device 99 has a drilled and tapped hole 102 for receiving the threaded end 103 of the rod 101.

A circular notch 104 is formed in the attachment device 99 as shown and is formed in the size of the notch 98 in the plates 97. As a result, the notch 104 on each device 99 is positioned in the notch 98 of each plate 97 during operation and moving of the platen. As a result the cylinders 100 can move the platen 43 at predetermined times. Whenever the platen is to be changed, the attachment devices 99 on each rod 101 can easily be lifted out of the notches 98 in the plates 97 so that the platen 43 can be rolled forward on the rods 45L and 45R into the platen transfer device shown in FIGS. 32-38.

Figure 19:
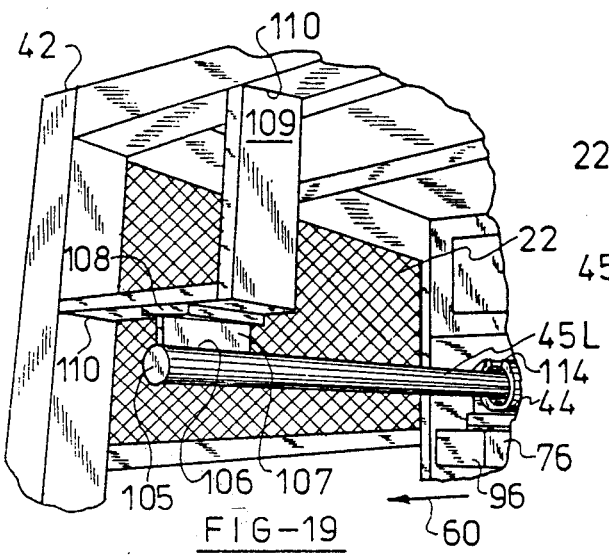
FIG. 19 is a perspective view, taken from the front of the applicants' machine, showing the front support for the left fixed supporting rail for the heating platen.
Figure 20:
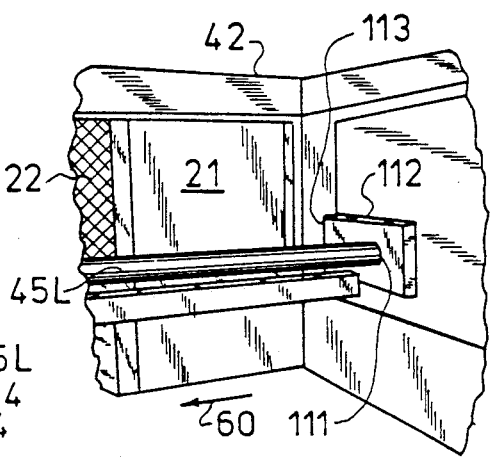
FIG. 20 is a perspective view, taken approximately 90° from the perspective view of FIG. 19 and showing the rear support for the left fixed supporting rail for the heating platen.

Referring now to FIGS. 19-22 of the drawings there will be described in detail the thermal expansion means, in the long direction 81 of the platen 43. As previously discussed, the platen 43 is carried by the elongated rods 45L and 45R. The left rod 45L is fixedly attached to the machine frame 42 while the right rod 45R is movably attached to the same frame. In other words, the rod 45R can move in the direction shown by the arrow 81 whenever the platen 43 expands and contracts as it is heated and cooled. FIGS. 19-20 show the fixed mounting of the left rod 45L which is hung at its front end 105 by welding it at 106 to the T-shaped frame 107 which is in turn welded at 108 to the L-shaped frame 109. The L-shaped frame 109 is welded at 110 to the supporting structure of the frame 42.

FIG. 20 shows the rear end 111 of the left rod 45L which is welded around the rod end to a plate 112 which is in turn welded at 113 to the supporting structure of the frame 42. It can then be seen how the left rod 45L is rigidly attached to the frame 42 and how the open top end 114 of the linear bearings 44 is able to pass over the T shaped frame 107 whenever the platen 43 is moved off of the rods 45L and 45R, in the direction of the arrow 60, and onto the platen transfer device rods 62 as will be described later.

Figure 21:
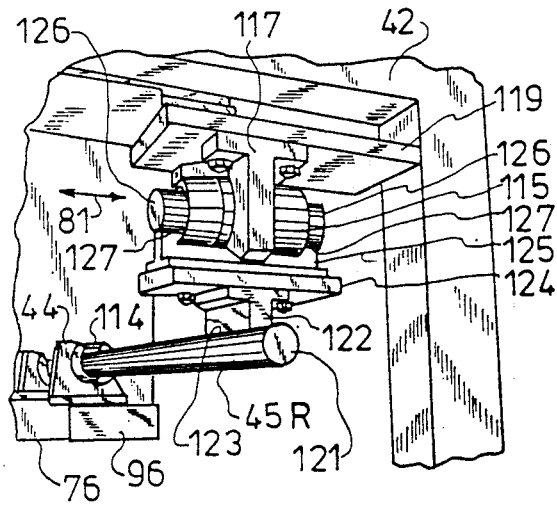
FIG. 21 is a perspective view, taken from the front of the applicants' machine, showing the front support for the right movable supporting rail for the heating platen.
Figure 22:
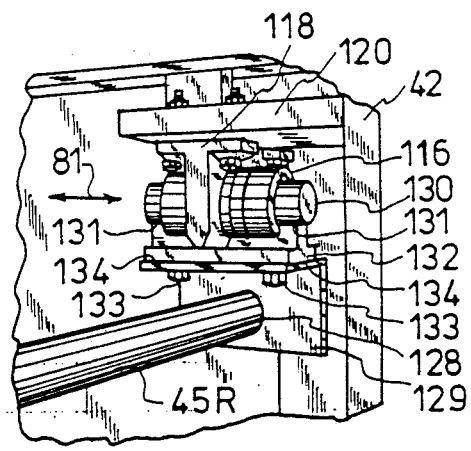
FIG. 22 is a perspective view, taken approximately 90° from the perspective view of FIG. 21 and showing the rear support for the right movable supporting rail for the heating platen.

Referring now to FIGS. 21 and 22 there can be seen in perspective the right rod 45R which is movably mounted so that the rod 45R can move in the direction shown by the arrow 81. A pair of transversely mounted linear bearings 115 and 116 and their bearing housings 117 and 118 are fixedly attached, by known attaching means, to the plates 119 and 120. The plates 119 and 120 are also fixed, by known attaching means, to the supporting frame 42 of the machine 10.

FIG. 21 shows a perspective view of the front end 121 of the right rod 45R and a T-shaped frame 122 is welded at 123 to the top of the rod 45R. The T-shaped frame 122 is also fixedly attached, by known attaching means, to the plate 124 which is also fixedly attached to an inverted T-shaped frame 125. A short rod 126 is welded at 127 to the inverted T-shaped frame 125 and the short rod 126 rides on the fixed linear bearing 115 in the bearing housing 117 as the platen thermally expands in the direction shown by the arrow 81.

In a similar manner it can be seen in FIG. 22 how the rear end 128 of the rod 45R is welded on the end to the angle 129. The angle 129 is not fixed to the frame 42 but is free to move in the direction of the arrow 81. The rear end 128 of the right rod 45R is hung from the supporting frame 42 off of the plate 120 which is fixed to the frame 42. The rear linear bearing 116 and the bearing housing 118 is bolted or fixed by known means to the plate 120. It can then be seen how the plate 120, the bearing housing 118 and the linear bearing 116 are fixedly attached to the supporting frame 42.

A short rod 130 is welded at 131 to an inverted T-shaped frame 132 which in turn is fixed with bolts 133 to the horizontal surface 134 of the angle 129. The short rod 130 then rides in the linear bearing 116 supporting the right rod 45R, the angle 129 and the inverted T-shaped frame 132. From this it can be seen how the right rod 45R is hung from the linear bearings 115 and 116 and the bearing housings 117 and 118 and is free to move as the platen 43 thermally expands in the long direction shown by the arrow 81. A modified way of hanging the rods 45L and 45R will be described hereinafter when referring to FIGS. 39 and 40.

The use of an open front on the machine 10 with linear bearings 44 guiding the platen 43 on the rods 45L and 45R is a major advancement in the art which allows for a quicker change of battery types having different dimensions. The novel design allows for changes in length and width dimension tooling of the heating platen by changing the entire platen, its carrier and guides, without effecting previous settings of the same platen used in prior production. The expansion control in both lateral directions removes stress in the bearings caused by thermal growth of the platen.

The novel hanging of the platen 43 on the rods 45L and 45R as shown in FIG. 19-22 allows the platen unit fixed corner on the left rod 45L to be always aligned to the adjacent mating corner on the top cover 14 and on the same corner of the battery container 13 thus providing a fixed reference point and assuring proper alignment, even when the platen grows and then later returns to its original position upon heating and cooling.

Turning now to FIGS. 23-31, there will be described in detail the unique top cover holding device 46 which grasps the top cover and holds it as it is raised or lowered in the applicants' machine 10. FIG. 23 is a perspective view of the top of the holding device and FIG. 24 is a perspective view of the bottom of the holding device, taken along line 24—24, showing the device rotated approximately 90° from the view of FIG. 23. The holding device may be formed in one or two pieces and normally may be formed with an elongated flat plate 135, having a top side 136 and a bottom side 137. When formed in two pieces, a second plate 139 is bolted by the bolts 140 to the bottom side 137 of the plate 135.

The plate 135 and the plate 139 have formed therein a plurality of holes 138 and plurality of holes 141 along with a plurality of elongated holes 142. Finger means 143 are positioned through the holes 141 and 142 and extend out of the top side 136 of the flat plate 135 and out of the bottom side 144 of the lower plate 139.

The top side 136 of the flat plate 135 contains means for moving the finger means 143 outwardly and inwardly at predetermined times to grasp and release the top cover as desired. The moving means may comprise in part a pair of air or hydraulic cylinders 145, 146 along with the necessary hoses 147, 148, 149 and 150 which are connected to the appropriate hose fittings 151 and 152 supported on the bracket 153 fixedly attached to the top side 136 of the flat plate 135.

The top cover holding device 46 also has positioned on the top side thereof means for mounting the moving means on the top side 136 of the flat plate 135 with the finger means 143 being fixedly attached to the mounting means. The mounting means may comprise in part a pair of spaced apart elongated bars 154 and 155 which are designed to move outwardly and inwardly in the direction shown by the arrows 156 and 157.

FIG. 25 is a cross-sectional view, taken along line 25—25 of FIG. 23 and shows a plurality of inverted U-shaped frames 158 and 159 which are positioned over the elongated bars 154 and 155 and are bolted to the flat plate 135 by a plurality of bolts 160 positioned in drilled holes in the U-shaped frame 159 (not shown) and in drilled and tapped holes (not shown) in the top side 136 of the flat plate 135. The U-shaped frames 158 and 159 are positioned over each bar 154 and 155 in the design shown.

It can be seen in FIG. 25 how the bars 154 and 155 are designed to move outwardly and inwardly in the direction shown by the arrows 156 and 157 by being sized somewhat smaller than the opening 161 formed by the inverted U-shaped frames 158 and 159. The movement, shown by the arrows 162 and 163, is approximately ⅛ of an inch in either direction.

The use of the movable bars 154 and 155, to which are connected the finger means 143, allows the applicants' unique holding device to pick up a top cover for larger and heavier batteries such as a battery that may be 10 inches wide and 20½ inches long. Prior art holding and pickup devices used vacuum cups or picked up the top cover from the side. This was satisfactory for smaller batteries but not for the larger size batteries. Prior art clamping devices also used clamps on opposite sides or ends of the top cover, rotating fingers in the vent holes, radially expandable rubber retainer bushings actuated by cylinders, among other devices. These devices also worked on automotive size top covers but were not adequate for the larger commercial batteries. The large area of the top cover resulted in more flex in the top cover which resulted in difficulty in lifting and positioning of the top cover with prevision.

The applicants' novel design shown in FIG. 26 involves the use of two or more finger means 143 positioned in the holes 141 and 142 which are positioned in the battery vent wells. The activation of the fingers in opposite directions thereby causes the clamping or holding of the top cover 14 precisely, assuredly and without a tendency to warp or flex the top cover 14. This results in a top cover holding device 46 which is stronger and surer than prior art and in a device that will work with finger means 143 in multiples of two or with odd numbers, such as two opposed to one or three opposed to two and others. This then allows the applicants' novel holding device 46 to be used on the largest commercial top covers 14 of the copolymer composition with prevision and with repetition.

FIG. 26 is a cross-sectional view, taken along lines 26—26 of FIG. 23 and shows in more detail the novel finger means 143 and how they are mounted on the bars 154 and 155. While there are various constructions possible for the finger means 143 within the spirit and scope of the invention, only one means will be shown for brevity. A bolt 164 is positioned through the holes 169 in each rod 154 and 155 and is threaded into a drilled and tapped hole 165 in the fingers 166. A series of slots 167 are formed around the outside of the fingers 166 and aid in the finger grasping the outer surface 168 of the vent holes in the top cover 14 shown in dashed lines in FIG. 26.

FIG. 27 is an enlarged side view of the fingers 166 and shows in a breakaway portion the internally drilled and tapped hole 165. FIG. 28 is a top plan view, taken along lines 28—28 of FIG. 27 and shows the top surface 170 of the fingers 166 and the drilled and tapped hole 165.

From the above, it should be apparent that an application of air to the cylinders 145 and 146 will cause the cylinders to force the two bars 154 and 155 outwardly to cause the fingers 166 to grasp the outer surfaces 168 of the holes in the top cover 14. This occurs because each of the cylinders 145 and 146 is mounted on brackets 171 and 172 which are then bolted, by the bolts 173, to the movable bars 154 and 155 into drilled and tapped holes (not shown) in the bars 154 and 155. In addition the threaded ends 175 of the cylinder rods 174 are positioned in holes (not shown) in the brackets 171 and 172 and extend through the holes and are held by the nuts 176 as can be seen in FIG. 23.

A reverse of the air on the air cylinders 145 and 146 will then cause the fingers 66 to move together inwardly to release the top cover 14. The application and release of air is controlled as desired to grasp and pick up the top cover and to release the top cover as required in the timed sequence of the applicants' machine. The use of the novel shaped fingers 166 relies on opposing pressure of the fingers 166 in the vent well surfaces 168 of the top cover 14. Since the shape of the lower vent portion 177 of the vent wells on the top cover 14 may vary from cover to cover or from different top cover manufacturers, the fingers 166 do not pick up on the lower portion 177 since the grasping surface does not go to the bottom portion 177 of the top cover vent well. The applicants' fingers 166 are tapered inwardly around the surface 178 terminating at an extension 179 which may or may not be used as desired.

The fingers 166 then apply opposing pressure to the upper level 180 of the vent wells which is closer to the top center line 81 of the top cover 14 thereby providing a more sure clamp of a flexible top cover 14. The application of pressure in the area of the top cover center line 181 reduces twisting and distorting of the flexible top cover 14. This also permits two or more grasping points which is sufficient for the common automotive battery under twelve inches in length. However in large commercial batteries with two or more rows of vent points, at least four grasping points are usually required.

Referring now to the FIGS. 29-31 there is shown a modification of the top cover holding device, shown generally by the numeral 182 which uses the before described two grasping points with two opposing fingers 166 for a smaller battery top cover 184 shown in dashed lines in FIG. 29. A smaller top plate 183 would have two movable elongated bars 185 and 186 positioned in-line and would be activated by a single air or hydraulic cylinder 187 which is mounted on one end of the bar 185 by the bracket 188 and on the other end on the bar 186 by the bracket 189. The brackets 188 and 189 may be mounted to the bars by welding or some other means and would have formed therein drilled and tapped holes (not shown), for threading of the cylinder rods 190 and 191 into the holes.

The threaded ends of the rods 190 and 191 may then be positioned in the threaded holes and would be held in place by the nuts 192 and 193. Each bar 185 and 186 would have a pair of inverted U-shaped frames 194 positioned around the bars and the frames would be welded at 195 to the modified top plate 183. This can be seen in FIG. 31 which is an end plan view, taken along lines 31—31 of FIG. 30.

It can thusly be seen in the modification shown in FIGS. 29-31, how the bars 185 and 186 are free to move outwardly and inwardly in the direction shown, by the arrows 196 and 197, whenever air or hydraulic fluid is applied or removed from the cylinder. The attached fingers 166 can then grasp the smaller top cover 184 close to the center line of the cover as before described.

Referring now to the drawing FIGS. 32-38 there is shown the applicants' novel heating platen transfer device generally by the numeral 198. As before described, the use of the round guide rods or rails 45L and 45R and the platen linear bearings 44 permit the transfer of the outgoing platen 199 with its linear bearings 44 from the heat sealing machine 10. This is accomplished by opening the transparent front cover door 17 and by moving the mobile transfer device 198 into position.

The transfer device 198 is formed with an upwardly standing horizontally movable fixed first frame 201 which can be positioned in close proximity to the heat seal machine 10. A second frame 202 is also upwardly standing and is vertically movable on the first frame 201 up and down in the direction shown by the arrow 203. The second movable frame 202 has fixedly attached thereto two pairs of cantilevered rods 62 of the same diameter as the rods 45L and 45R which carry the platen 43.

These rods 62 are used to remove the outgoing heating platen 199 from the machine 10 and for providing an incoming platen 200 to be moved into the machine 10 after the outgoing platen 199 is removed. The vertically movable frame 202 is designed to roll on the fixed frame 201 upwardly and downwardly as a cable 204 is turned by a manual cable winch 205 fastened to the bracket 206 attached to the first frame 201 as shown in FIGS. 32 and 33.

The cable 204 is positioned over a pulley 207 rotatably mounted by the shaft 208. The shaft 208 is carried in holes (not shown) in brackets 209 and 210 which are fixed to the fixed frame 201. The cable 204 may also be positioned over a second pulley 211 and may be fixed back onto the fixed frame for more mechanical advantage. The bottom of the fixed frame 201 contains a plurality of wheels or casters 212 which allow the transfer unit to be easily moved into place, so that the ends 213 of the cantilevered rods 62 will abut the ends 105 and 121 of the rods 45L and 45R which carry the platen.

FIGS. 34 and 35 are partial plan views, taken along lines 34—34 and 35—35 of FIG. 32 and show more detail on the movable mounting of the movable frame 202 on the fixed frame 201. A pair of upper wheels or rollers 214 are carried by the shafts 215 and are fixed to the brackets 217 by the nuts 216. The brackets 217 are fixedly attached to the movable frame 202, which permits the wheels or rollers 214 to ride on the surface 218 of the fixed frame 201.

In a similar manner, the lower wheels or rollers 219 are carried by the shafts 220 which are in turn fixed to the brackets 222 by the nuts 221. The brackets 222 are also fixed to the movable frame 202 which allows the lower wheels 219 to ride on the surface 223 of the fixed frame 201. FIGS. 34 and 35 show only one side for the mounting of the rollers 214 and 219 and the opposite side would be a duplicate thereof.

Referring now to FIGS. 36 and 37 there are shown two views, similar to the views of FIG. 3 showing how the outgoing platen 199 is removed from the heat seal machine 10. The transfer device 198 has been positioned against the machine 10 after an incoming platen 200 has been positioned on the upper cantilevered rods 62 as shown. By positioning the ends 213 of the lower pair of rods 62 against the ends 105 and 121 of the machine rods 45L and 45R, the outgoing platen 199 can be rolled onto the lower rods 62 on the transfer device 198 by moving it in the direction of the arrow 224. Previously the two platen cylinder attachment devices 99 have been removed from the two notches 98 on the platen as shown in FIGS. 13 and 14. A modified chamfer fit for the ends 213 of the rods 62 and the ends 105 and 121 of the rods 45L and 45R will be described later when referring to FIG. 38.

After the outgoing platen 199 is positioned on the two lower cantilievered rods 62, as shown in FIG. 36, the movable frame 202 can be lowered, in the direction shown by the arrow 225, by turning the winch 205. Whenever the upper cantilevered rods 62 are positioned so their ends 213 are in juxtaposition to the ends 105 and 121 of the machine rods 45L and 45R, the incoming platen 200 may be rolled onto the machine rods 45L and 45R in the direction of the arrow 226. Thereafter the two platen cylinder attachment devices 99 are attached to the two notches 98 in the incoming platen 200 as shown in FIGS. 13 and 18.

From this it can be seen that the transfer of the incoming platen 200 to the machine 10 and the removal of the outgoing platen 199 from the machine 10 to the mobile transfer device is a safe method of platen exchange when both platens are hot and ready for use. The transfer is safe for personnel exchanging the hot platen units and avoids possible handling damage to the platen units.

From the foregoing, it can be seen that the applicants have shown and disclosed herein a new and novel battery heat sealing machine and method, with the machine having novel internal components such as the one-piece heating platen. In the preferred embodiment, the cartridge heaters 90 would preferably be the type manufactured by the Watlow Company, and known as Firerod Heaters, Part Number J10462. In addition, the thermocouple 93 would preferably be the Part Number 200-J-6-36, type J as manufactured by the Thermal Corporation. Other types of heaters and thermocouples may also be employed within the spirit and scope of the invention.

While the top cover holder 46 lifting structure and the top cover melt stop mechanism 49 have been briefly described, for purposes of brevity, other lifting and stop mechanisms may be designed and used with the applicants' novel top cover holder 46. In addition, the container melt stop mechanism 55 has also been briefly described for purposes of clarity and other mechanisms may be used in the battery heating machine within the spirit and scope of the invention.

The novel features of the one-piece heating platen 43 and the unique top cover holding device 46 have been shown as a preferred embodiment as has the new platen transfer device 198 used in conjunction with the novel hanging of the platen 43 in the applicants' machine. These unique design features may also be modified within the spirit and scope of the invention and the applicants are not to be limited to the exact features shown and described which have been given by way of illustration only.

Referring now to FIG. 38 of the drawings, there is shown a modification of the ends 213 on the four rods 62 and the ends 105 and 121 on the rods 45L and 45R. FIG. 38 is a side elevational view, shown partially broken away, which illustrates how the ends of these rods may be modified, if desired, to make the connections between the rods more secure. The ends 213 of the four platen transfer device rods 62 may be provided with a chamfer 227 and with a male protuberance 228.

In a similar manner, the ends 105 and 121 of the machine rods 45L and 45R may have a mating surface with an internal chamfer 229 terminating with a female cylindrical opening 230. When formed thusly, the male end 228 of the rods 62 of the platen transfer device 198 may be easily guided into the female opening on the ends 105 and 121 of the rods 45L and 45R. This allows the outgoing platen 199 and the incoming platen 200 to be rolled from the machine to the transfer device and back as desired.

Figure 39:
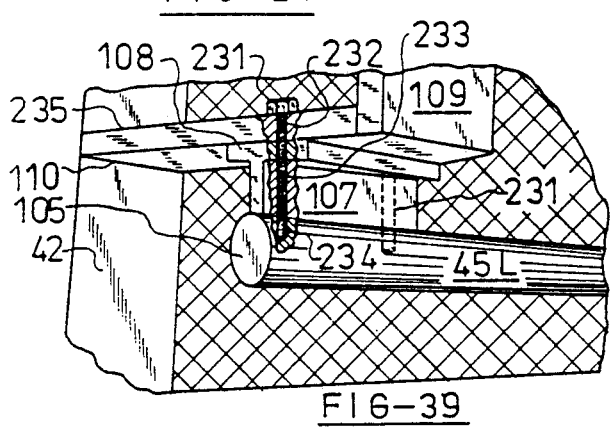
FIG. 39 is an enlarged perspective view, partially broken away, similar to the view of FIG. 19, showing a modified front support.
Figure 40:
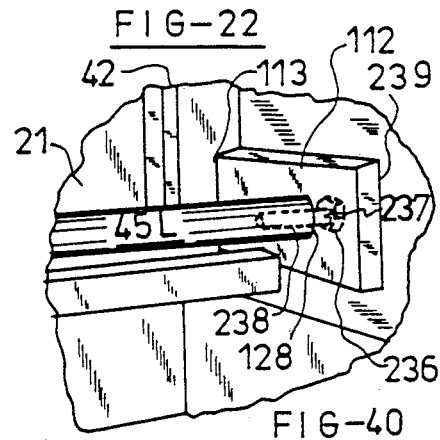
FIG. 40 is an enlarged perspective view, similar to the view of FIG. 20, showing a modified rear support.

Referring now to FIGS. 39 and 40 there will be described modifications to the hanging of the rods 45L and 45R. It may be desirable to bolt the rods 45L and 45R to their respective frames instead of welding as before described when referring to FIGS. 19-22. When this construction is utilized, a pair of elongated bolts 231 would be positioned in a pair of holes 232 and 233 in the L-shaped frame 109 and in the T-shaped frame 107. The bolts would then be threaded in drilled and tapped holes 234 in the rod 45L with their heads grounded on the upper surface 235 of the L-shaped frame 109. The front bolt 231 is shown in FIG. 39 in a cutaway portion while the rear bolt 231 is shown in dashed lines in FIG. 39.

The rear end 128 of the rod 45L, as shown in FIG. 40 may then have a drilled and tapped hole 238. A bolt 236, shown in dashed lines would then be positioned through a hole 237 in the plate 112 and would be threaded into the tapped hole 238 with its head grounded on the rear surface 239 of the plate 112. When formed thusly, the left rod 45L may be bolted instead of welded as before described.

In a similar manner, the right rod 45R may also be bolted instead of welded as before described if desired. While FIGS. 39-40 show only the left rod 45L modified, it should be readily apparent to one skilled in the art how the same construction could be applied to the right rod 45R.

From the foregoing it should also be apparent how other changes may be made in the applicants' novel structures and in the steps of the method within the overall spirit and scope of the invention. The embodiments and modifications shown and described have been given only for illustration and are not to be construed as limiting the applicants' invention.

Having described our invention, we claim:

1. In a battery heat sealing machine having a supporting structure and being of the type which normally contains a multi-piece heating platen with a plurality of internal heaters and a thermocouple, with the machine being the type where a battery container, having internal parts and external terminals and having an upper surface and having a top cover and the battery container being heated and sealed together, the improvement comprising:
    (a) the platen being formed in a one-piece construction having a central core section and having formed therein a plurality of spaced apart openings being formed in the central core for receipt of the plurality of internal heaters and the thermocouple;
        (1) an integral first external heating surface, formed on the central core section, for transferring heat from the heaters and for heating the upper surface of the battery container;
        (2) an integral second external heating surface, formed on the central core, for transferring heat from the heaters and for heating the lower surface of the top cover;

(b) mounting means, associated with the one-piece platen and with the heat sealing machine supporting structure for mounting the one-piece platen in the machine; and (c) the one-piece platen construction with internal spaced apart openings for heaters eliminating warpage in the platen caused by heating and cooling of a multi-piece heating platen and eliminating corrosion in the platen that occurs between adjoining surfaces of a multi-piece heating platen and eliminating heat transfer differential to thereby provide a more uniform heating of the two surfaces on the battery container and on the top cover.

2. The improvement as defined in claim 1 further comprising the one-piece platen containing thermal growth means for thermal expansion of the platen in two directions to relieve stress on the mounting means and the heat sealing machine supporting structure.

3. In a battery heat seal machine having a supporting structure and of the type wherein a battery container and a top cover with vent holes and vent hole sides are moved into place and the top cover is clamped and moved upward from the container and a heating platen with a plurality of bearings is inserted in the machine to cause the upper surface of the battery container and the lower surface of the top cover to be heated by the platen until both surfaces are molten and the container and top cover are disengaged from contact with the heating platen which is then removed to allow the top cover and the battery container to be mated together, the improvement comprising:

(a) the heating platen being formed in a one-piece configuration having two oppositely positioned heating surfaces with a top heating surface for contact with the top cover and with a bottom heating surface for contact with the upper surface of the battery container, the platen containing internal means for heating the two platen surfaces with the one-piece configuration eliminating heat transfer differential and reducing warpage in the platen thereby providing a more uniform heating of the two surfaces to be mated and sealed; and (b) the one piece heating platen containing thermal expansion means, the expansion means permitting the thermal growth in two lateral directions to remove stress on the bearings of the platen caused by restrained thermal growth and stress on the supporting structure of the machine, the improvements providing a more uniform heating of the upper surface of the battery container and the lower surface of the top cover which are subsequently mated and sealed together.

4. The improvement as defined in claim 3 further comprising the one-piece platen being formed with two pairs of linear bearings mounted on each side of the platen and fixedly attached to opposite sides of the platen, the pairs of oppositely positioned bearings being connected to each other by at least two spring biased rods positioned apart from the platen thereby permitting thermal expansion of the platen in one direction whenever the platen is heated.

5. The improvement as defined in claim 4 further comprising the one-piece platen being movably mounted on the heat seal machine along a pair of elongated rods with the linear bearings being carried by the pair of rods thereby permitting the entire platen to be quickly and easily transferred to an external platen transfer device whenever the platen needs to be changed.

6. The improvement as defined in claim 3 further comprising the machine having positioned thereon a top cover holding device for grasping the top cover and raising and lowering the top cover at predetermined times, the holding device comprising at least two oppositely positioned sidewardly movable and downwardly pointing fingers which may be positioned in the top cover vent holes and may be moved outwardly away from each other to grasp the vent hole sides of the top cover and may be moved inwardly toward each other to release the vent hole sides as desired thereby permitting the holding device to be used to raise and lower the top cover as desired during operation of the machine.

7. The improvement as defined in claim 6 wherein the holding device has at least two pairs of oppositely positioned fingers.

8. The improvement as defined in claim 6 wherein the holding device has at least two groups of three oppositely positioned fingers with each group of three fingers being movable together.

9. The improvement as defined in claim 3 further comprising the one-piece platen being formed with means for quickly releasing the platen from the machine so that the platen may be removed from the machine and another similar platen installed on the machine without lengthy downtime of the machine.

10. A battery heat seal machine for sealing a top cover with a lower surface and vent holes to a battery container having an upper surface comprising:

(a) a frame supporting structure;

(b) a conveyor, fixedly attached to the frame, for moving battery containers and loose top covers into the machine and for moving complete batteries with top covers heat sealed on the battery container away from the machine;

(1) means, associated with the frame and the conveyor, for raising and lowering the battery container at predetermined times;

(c) a one-piece heating platen, movably mounted on the frame and positioned above the conveyor during heating of the platen, the platen having two oppositely positioned heating surfaces with a top heating surface for contact with the top cover and with a bottom heating surface for contact with the upper surface of the battery container, the platen containing internal means for heating the two platen surfaces with the one-piece platen eliminating heat transfer differential in the platen to thereby provide more uniform heating of the top cover and the upper surface of the battery container;

(1) thermal expansion means, associated with the one-piece platen to permit thermal growth of the one-piece platen in two lateral directions to remove stress in the platen bearings and the supporting structure caused by thermal growth of the platen, the one-piece platen providing a more uniform heating of the upper surface of the battery container and the lower surface of the top cover which are subsequently mated and sealed together;

(2) means, associated with the frame and the platen, for moving the platen into and out of its position above the conveyor during heating of the platen;

(d) a top cover holding device for grasping and holding the top cover at predetermined times during operation of the machine;
  (1) means, associated with the frame and the holding device, for raising and lowering the holding device and the top cover at predetermined times during operation of the machine; and
(e) means, associated with the machine, for controlling the operation of the various parts of the machine at predetermined times and in a predetermined sequence.

11. The battery heat seal machine as defined in claim 10 wherein the one piece heating platen is formed with linear bearings mounted on each side of the platen and fixedly attached to opposite sides of the platen, the pairs of oppositely positioned bearings being connected to each other by at least two biased rods positioned apart from the platen to permit one direction thermal expansion of the platen whenever the platen is heated.

12. The improvement as defined in claim 10 further comprising at least two of the linear bearings are mounted on an elongated rod with the elongated rod being mounted on a transverse pair of linear bearings and a transverse pair of shorter rods, the mounting on the transverse pair of linear bearings and the transverse pair of shorter rods permitting the platen to thermally expand in a second direction whenever the platen is heated.

13. The battery heat seal machine as defined in claim 10 wherein the top cover holding device is formed with at least two oppositely positioned sidewardly movable and downwardly pointing fingers which may be positioned in the top cover vent holes and may be moved outwardly away from each other to grasp the top cover and may be moved inwardly toward each other to release the top cover as desired thereby permitting the holding device to be used to raise and lower the top cover as desired during operation of the machine.

* * * * *